United States Patent [19]

Karasawa et al.

[11] Patent Number: 4,543,197
[45] Date of Patent: Sep. 24, 1985

[54] PROCESS FOR PRODUCING MAGNETIC METALLIC OXIDE

[75] Inventors: Tadayoshi Karasawa, Tokyo; Katsumi Kawano, Chiba; Katsuji Uchiyama, Togane; Michio Yamazaki, Chiba, all of Japan

[73] Assignees: Japan Metals & Chemicals Co., Ltd.; Magune Co., Ltd., both of Tokyo, Japan

[21] Appl. No.: 488,265

[22] Filed: Apr. 25, 1983

[30] Foreign Application Priority Data

Apr. 27, 1982 [JP] Japan .................................. 57-69650
May 12, 1983 [JP] Japan .................................. 57-78082

[51] Int. Cl.$^4$ ............................................ C01G 49/08
[52] U.S. Cl. ............................... 252/62.56; 252/62.55; 252/62.64; 423/151; 423/152; 423/632; 423/633
[58] Field of Search ............... 252/62.56, 62.55, 62.58, 252/62.59, 62.63, 62.64; 423/151, 152, 632, 633

[56] References Cited

U.S. PATENT DOCUMENTS

| | | | |
|---|---|---|---|
| 1,647,737 | 11/1927 | Legg | 252/62.55 |
| 1,651,957 | 12/1927 | Lowry | 252/62.55 |
| 1,651,958 | 12/1927 | Lowry | 252/62.55 |
| 1,669,642 | 5/1928 | Andrews | 252/62.55 |
| 1,669,645 | 5/1928 | Andrews et al. | 252/62.55 |
| 3,000,828 | 9/1961 | Buckley et al. | 252/62.64 |

Primary Examiner—Arthur P. Demers
Attorney, Agent, or Firm—Parkhurst & Oliff

[57] ABSTRACT

A process for producing magnetic metallic oxide which comprises the steps of pulverizing at least one member selected from the group consisting of ferro-manganese, ferro-nickel, electrolytic manganese, electrolytic iron and electrolytic zinc, adding to the substance thus pulverized at least one member selected from the group consisting of oxides of Fe, Mn, Ni, Cu, Mg, Zn and Co and salts of Fe, Mn, Ni, Cu, Mg, Zn and Co which become oxides by heating, wet pulverizing and mixing the mixture upon oxidation, thereby producing a slurry, and heating said slurry at 800° to 1450° C. By this process, a magnetic ferrite can be stably and inexpensively synthesized.

13 Claims, 4 Drawing Figures

Fe 1 ····· primary oxidation
M³ ···· MnO+Fe₃O₄+Mn₃O₄
M⁴ ···· Mn₂O₃

Fe 2 ····· secondary oxidation
Fe 3 ····· high Fe concentration zone
M³,M⁴ ····· omitted AC ------- with rubber-lined mill,
ferromanganese medium and Hcl-type agent

PROCESS FOR PRODUCING MAGNETIC METALLIC OXIDE

BACKGROUND OF THE INVENTION

The present invention relates to a process for producing magnetic metallic oxide.

Soft magnetic oxide is generally represented by the general fundamental formula of $M^{2+}O\cdot Fe_2O_3$, where $M^{2+}$ signifies Fe, Mn, Ni, Cu, Mg, Zn or Co, part of which can be substituted by other metal. Since magnetic oxide which exhibits advantageous magnetic properties may be produced in a combination of these divalent metals, the oxide may be produced by suitably selecting the metals so as to match its utility.

It is reported that there is a process for synthesizing magnetic oxide of this fundamental formula. The synthesis employs as a starting material any of the oxides of the above metals and/or salts, of the above metals in a solution. It is also reported that ferrite is synthesized from a ferro-manganese alloy by dissolving ferro-manganese in hydrochloric acid and then adding any of the oxides of the above-mentioned metals to the solution. On the other hand, the present invention provides a novel process for producing magnetic metallic oxide which can be stably and inexpensively synthesized by employing ferro alloy, metals such as electrolytic zinc, alloys, oxide such as the oxides of Fe, Mn, Ni, Cu, Mg, Zn or Co or salts of Fe, Mn, Ni, Cu, Mg, Zn or Co which become oxides by heating without anisotropy.

It is ordinarily difficult to synthesize excellent ferro alloy by pulverizing ferro alloy, electrolytic iron, electrolytic manganese or electrolytic zinc and adding other metallic divalent oxide to produce the ferrite. Because, when these metals and alloys are pulverized and are oxidized by atomizing melted alloy, there exists a danger of an explosion occuring, the oxides of the metals or the alloys thereby obtained have a low activity and are segregated in the alloy. Accordingly, its local anisotropy becomes large in the magnetic oxide, which thus becomes non-homogeneous. This is mainly because adequate powder cannot be obtained due to the toughness and ductility of the ferro alloy or electrolytic metal and to the specific properties of the metal and alloy.

SUMMARY OF THE INVENTION

The present invention has an object to inexpensively produce magnetic ferrite by eliminating the drawbacks and disadvantages in the production thereof.

In the present invention the, metallic materials, ferro alloy or electrolytic metal, that have a ready pulverization are selected as basic ingredients to facilitate ferrite production. In other words, brittle ferro alloys or electrolytic metals are selected, or new products which are adapted for this are selected. As the ferro-alloy, low-carbon is ordinarily expensive and difficult to pulverize, but high-carbon ferro alloy is half as expensive and is brittle for ready pulverization.

More particularly, the alloy or metal which contains at least more than 3% of carbon, preferably 7 to 10% of carbon is used. In this case, the alloy or metal which contains more than 10% of carbon has more ready pulverization, thereby reducing the pulverization cost. However, the content of the carbon is limited by considering the necessity of oxidizing the metal or alloy, the increase in the content of Si due to the decrease in the content of carbon and the technical range of the possibility of exhausting melted alloy from a melting furnace in production.

Then, electrolytic metal of iron, manganese or zinc can be obtained as high purity metal when the purity of the melted electrolytic metal under the produced condition is high. This electrolytic metal has feasible pulverization and brittle property. This brittle electrolytic metal is further rendered to be readily pulverized by increasing the density of an electric current in the electrolyzing step and producing nearly dentritic metal. This electrolytic metal is more brittle than the ordinary metal and is more readily pulverized. This invention employs this more readily pulverized metal.

BRIEF DESCRIPTION OF THE DRAWINGS

The above and other related objects and features of the invention will be apparent from the following description and the accompanying drawings, and the novelty thereof pointed out in the appended claims.

DESCRIPTION OF THE PREFERRED EMBODIMENTS

Figure 1A:
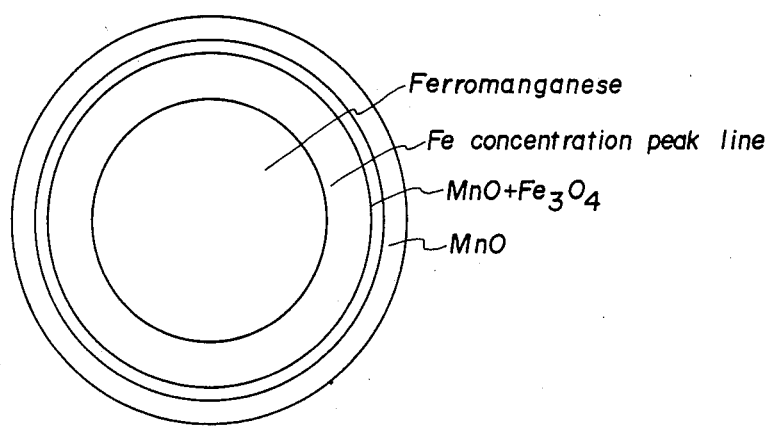
FIG. 1a is a sectional view of a particle of ferro-manganese alloy in the course of oxidation.

An actual synthesis of ferrite according to the present invention will be described in more detail below. When magnetic ferrite of the fundamental formula $M^{2+}O\cdot Fe_2O_3$ is synthesized as described above, the ratios of the constitutions of Mn and Fe in the alloy and of the oxides are as follows:

Ratio of Mn to Fe in high carbon ferromanganese
60:40
90:10
Ratio of weights of oxides $MnO+Fe_2O_3$
4254:3192
6381:798
Weight of insufficient $Fe_2O_3$:
6384
13566

Thus, a weight of $Fe_2O_3$ of 6384 to 13566 supplies insufficient. This insufficiency $Fe_2O_3$ is supplemented by any of hematite, mill scale, ordinarily used $Fe_2O_3$ and salt of Fe. It is necessary as the first step to pulverize the metal or alloy for the ferrite.

It is to be noted that powder particles of 3 microns in diameter and, particularly less than 5 microns in diameter of metallic ion ordinarily burn or explode when pulverized at ambient temperatures in the air. This phenomenon occurs when the particles exhibit a cluster. When the particles float in the air, the metallic iron explodes according to the general conditions of temperature rising velocity, pressure rising rate and the mixture ratio of the air. This phenomenon is a fundamental problem which always occurs when the metallic powder is pulverized. In order to avoid this problem, the metallic iron is calcinated and oxidized while the particles remain rough, or the particles are pulverized in inert gas. Further, a method of pulverizing the metallic powder in a wet state can be considered.

A dry process will be first described. Pulverization of the metals or alloys can be performed by various types such as a ball mill, a vibration mill, an atomizer or an impact post pulverization.

In the present invention, the metallic iron is pulverized in inert gas by the vibration mill and the ball mill. The pulverization media preferably has the same quality as the material to be pulverized or is a material that is capable of being altered to have the same quality of the material to be pulverized and has large, middle and small diameters, in which the weight of the media of small diameter is 40 to 90% together with a batch or continuous type classifier.

Alloy steel ingots for the media to be prepared have 40 to 20 mm in large diameter, 10 to 8 mm in middle diameter and approximately 5 mm in small diameter. These ranges exhibit approximate numerals and may increase or decrease within the limits of these ranges. Further, ordinary steel media may be partly incorporated together with these media.

Steel ingots which have irregular corners produced by arbitrarily dividing the ingots may also be used as the media. The media having such corners are worn during use and develop an irregular spherical shape.

The media also develop irregular diameters due to long usage, variable from middle diameter to small and fine diameters and become powder particles as pulverized by the ingots which are supplied later. The particles thus produced through the above described pulverizing step have a drawback in that they develop a wide particle size distribution. This can be eliminated by providing and operating a classifier.

In the present invention rough particles are used as a method of avoiding the explosion phenomenon in the pulverization of the metallic powder to pulverize the metal which belongs to the group of ferro-manganese, ferro-nickel, electrolytic manganese, electrolytic iron, and electrolytic zinc, hereinafter referred to as Group A of the present invention. However, when the powder is calcinated as it is, the oxide which is thus obtained does not have desired properties. Since the manganese alloy which is thus obtained remarkably deteriorates in the performance according to the particle size of the powder, it is necessary to carefully adjust it.

Figure 1B:
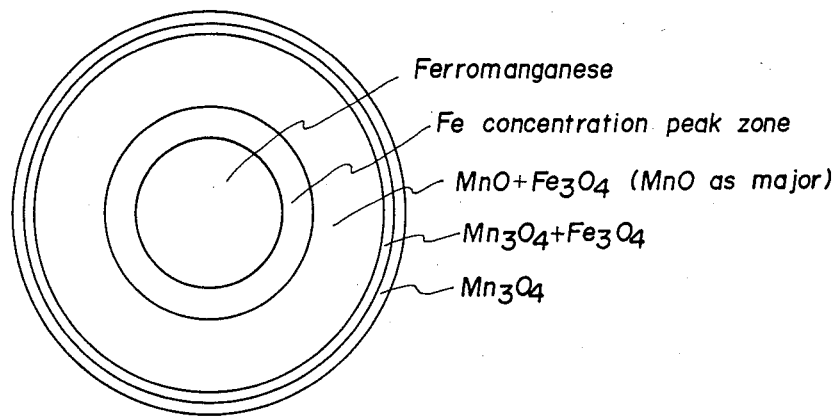
FIG. 1b is a sectional view of a particle in which an oxidation is further advanced.

For example, FIGS. 1a and 1b show the result measured by an X-ray microanalyzer of the oxidized state of a ferro-manganese particle which is heated to 1000° C. by an ordinary heating method.

When observing the oxidizing step from the result, it is seen that the carbon is partly volatilized as CO gas, the Mn becomes MnO, thereby forming a surface layer. Thus, the Fe is activated by the carbon, is dissociated upon production of the MnO, is dispersed and moved into the alloy, and a small amount of the remaining Fe becomes $Fe_3O_4$ such a state is shown in FIG. 1a.

Figure 2:
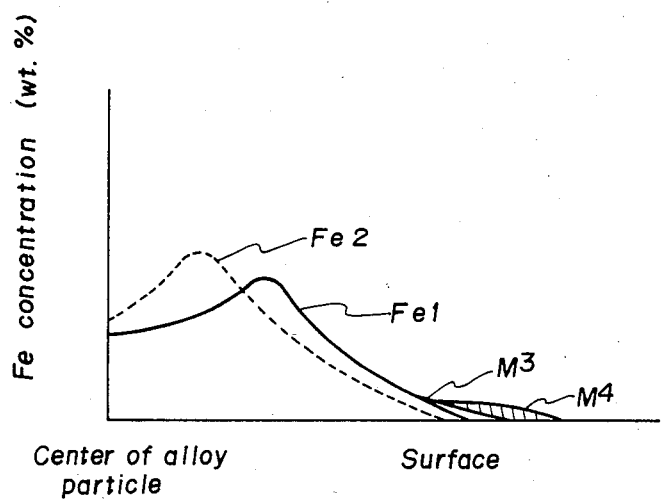
FIG. 2 is a graphical diagram showing the deviation in the concentration of Fe from the surface to the center of the particle when the ferro-manganese alloy particle is oxidized.

In the second step, the MnO of the surface layer slightly becomes $Mn_3O_4$. The range of the MnO internally expands into the interior of the alloy, and the Fe surrounds the alloy layer of the initial composition in a similar manner as in the previous step, thereby forming a high Fe concentration layer. This state is shown in FIG. 1b. Such oxidation step advances in a similar mechanism irrespective of the size of the particles. The Fe layer of further high concentration is produced at a later time of the oxidation of the powder having particles in larger diameter, thereby increasing the concentration of Fe at the center of the alloy, as shown by Fe2 in FIG. 2.

When the segregated particles arre oxidized in this manner, the particles do not become a homogenous oxide. An example of the characteristics of the particles of the ferro-manganese performed through the above described oxidation step used for the manganese ferrite is shown as follows:

| Mean particle diameter of ferro-manganese (microns) | $\mu_0$ | Bm | Q |
|---|---|---|---|
| 70 | 105 | 3100 | 10 |
| 46 | 110 | 3700 | 15 |
| 10 | 180 | 4810 | 24 |
| 5 | 195 | 4850 | 30 |
| 2 | 216 | 4900 | 35 |
| 1 | 232 | 5000 | 40 |

The ferro-manganese is first pulverized to 6 to 300 mesh, and preferably 150 mesh, (approximately 104 microns), for safety reasons in consideration of the above results. The ferro-manganese is then pulverized to an average diameter of less than 10 microns in inert gas, is then cooled, and $Fe_2O_3$ along with oxides of Mn, Ni, Cu, Mg, Zn and Co or salts of these metals which become oxides by heating are added and mixed. The $Fe_2O_3$ is added in an amount of 36 to 60 mol%. The oxides or salts comprise 50 to 98% of the mixture. The mixture is subsequently kneaded and granulated in water which contains a binder in the invert gas, is then dried, is abruptly heated at 900° to 1000° C. in the air, thereby rapidly removing the carbon, to prevent the segregation of Fe, thereby oxidizing most of the ferro manganese, and is then continuously pulverized up to 1 microns in diameter in the art. The rapid removal of the carbon and the oxidation act to shorten the later pulverizing time. The fusion-bonding of the alloy particles or segregation of the Fe in the particle can be prevented by the addition of oxides such as $Fe_2O_3$ and further ZnO, NiO or MgO and can also facilitate the oxidation. However, this has drawbacks in the management of the air in the pulverization and the pulverizing time.

The magnetic characteristics of the manganese ferrite powder are as follows.

| $\mu_0$ | Q | Bm |
|---|---|---|
| 248 | 45 | 5050 |

A wet pulverizing process which can facilitate the management as compared with the above described dry pulverizing process will now be described. In the wet pulverizing process, there exists a slight problem. In other words, it is fundamental that, when an acid is reacted with metal, $H_2$ gas is ordinarily produced. Also, when water is impregnated with metallic zinc, the zinc becomes flammable, and Mg and Zr ignite in the presence of $CO_2$. Furthermore, when the surface of the metal is cleaned, the metal is activated and heated, and reacts with alkali or water, thereby producing hydrogen. They are heated and oxidized even at an ambient temperature in the presence of iron powder and NaCl and water content, thereby producing HCl.

As described above, the metallic powder is heated and exhibits a variety of phenomenon such as an ignition or an explosion according to the various conditions such as its activity, the atmosphere surrounding the powder, heating, shock, friction or static electricity.

According to experiments, when a powder of particles having a diameter of 100 microns is pulverized a wet state, the temperature in the pulverizing machine reaches 90° C. When the cover of the machine is opened, part of the slurry and gas are strongly ejected, thereby creating a danger of a scald or an explosion.

It is necessary in the process of the present invention which directly relates to the above various phenomena to treat or prevent the explosion of powder dusts and $H_2$ gas. The powder dusts which are the most important can be eliminated by the wet pulverization process, and the $H_2$ gas can be eliminated by a mechanism which can feed air containing a suitable amount of steam into the pulverizing machine, adjust the moisture in the machine, exhaust the gas, feed air of the amount proportional to the detected amount of the gas and adjust constantly the temperature at approximately 50° to 80° C. irrespective of the detected amount of the gas. Since the product is adjusted to have a constant particle size distribution by the classifier, the product can be set in terms of diameter to an ideal value.

An embodiment of a process for producing magnetic metallic oxide by the wet pulverization method using the above described apparatus will now be described.

In the wet pulverization method, all the metals in the group A can be treated in the same manner as described above.

$O_2$, $H_2O_2$, $NH_4NO_3$, $FeSO_4$, $H_2S$ manganese peroxide or its salt, nitric acid, nitrous acid or its salt, and sulfuric acid or its salt may be used as an oxidizer. It normally takes a long period of time to pulverize the metallic powder out according to the process of the present invention, the pulverizing time can be shortened. An example in which the metallic powder is pulverized by a mill filled with $N_2$ gas according to the process of the present invention is shown by the $N_2$ curve in FIG. 3. In this case, since $O_2$ is already contained in water medium, the effects of the $O_2$ on the reaction are observed.

When the powder is the pulverized with the water as a medium while introducing air from the exterior, the slurry which contains the powder of high activity and the media vigorously impact each other and agitate each other, and an oxidized film or dissolved film are produced on the particles. The films are readily ground by the media, and the activated new metallic surfaces are again presented on the particles. These reaction and grinding operations are vigorously repeated, and the consumed oxygen is absorbed and supplemented from the air which is introduced externally. The temperature is further raised due to the energy required for pulverizing the powder and the chemical reaction heat, thereby enhancing the pulverizing efficiency of the powder. The repetition of the reaction largely affects the pulverizing time.

Figure 3:
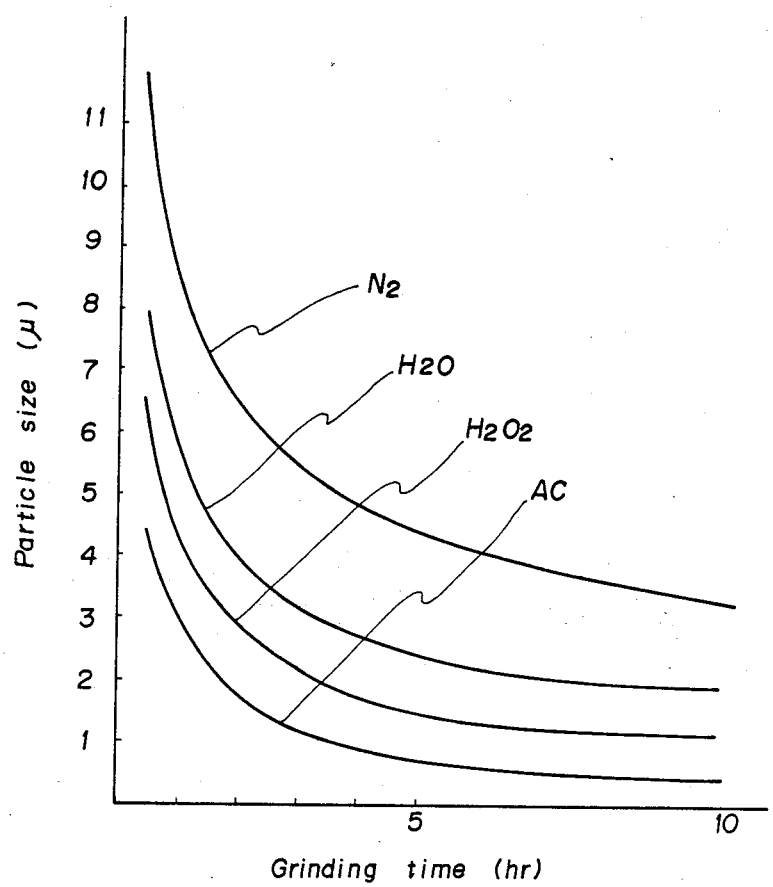
FIG. 3 is a graphical diagram showing the relationship between the pulverizing time of the ferro-manganese alloy and the diameter of the particle under various conditions.

As shown in FIG. 3, $H_2O_2$ further improves the pulverizing efficiency, and continues the efficiency by sequentially supplying $H_2O_2$. When the powder is pulverized in a solution which further contains iron sulfate and another acid radical, it is ideal to use as an inner lining of the mill an oxidation resistant substance such as, for example, rubber and the media of ferro-manganese (manganese alloy) which is worn out at the corners. This method has an effect of preventing the introduction of impurities to the contents in the pulverizing machine. Particularly, it can prevent the mixture of silicon due to the wear of the media. In this pulverizing method, the slurry which contains the powder of wide reaction area and the media are vigorously impacted upon and stirred each other repeatedly by the water, acid radical, oxygen and temperature, the powder is mainly dissolved and oxidized, and the media are also corroded and worn. The products in this reaction mainly contain hydroxide, and salt or oxide. In this case, even if sulfuric acid is used instead of iron sulfate, the Mn or Fe can be dissolved without any change. This powder dissolving method largely depends upon the supplementing quantity of the solution, and remarkably contributes to the shortening of the pulverizing time. On the other hand, it becomes necessary in a next step to treat a corrosion resistance and to treat waste gas. The waste gas can be neutralized inexpensively since the quantity is small. The metallic powder thus wet pulverized upon oxidizing as described above mainly contains a mixture of hydroxide and small amount of salt, and when the pulverizing time is insufficient, small amounts of metallic components might remain. The case that the small amounts of the metallic components remain is neglected here since the metallic components can be readily oxidized in a later step as will be described.

In another embodiment of the process of the present invention, there is a process for producing magnetic metallic oxide which includes the steps of drying the slurry thus pulverized and oxidized, weighing and mixing the insufficient component, pelletizing the component and calcinating the pellet or dehydrating to remove the soluble substances, adjusting the insufficient component, pelletizing the component and calcinating the pellet to synthesize the ferrite.

The calcinating temperature for producing the ferrite is preferably in the range of 800° to 1450° C. It is also preferred to employ a method of calcinating the pellet molded from the slurry at 700° to 1250° C., repulverizing the component, molding it in a predetermined shape, and sintering it at 800° to 1450° C.

When the calcinating temperature is lower than 800° C., the ferrited or spinel structure of the powder is incompletely produced, and the metallic oxide is in a mixed state. When the calcinating temperature is higher than 1450° C., the powder is melted in an amorphous state, or even if the powder is in ferrite structure, the crystalline grains become large, with the result that its electric resistance becomes low, which is not preferred. Therefore, it is necessary to set the calcinating temperature to the range of 800° to 1450° C.

The metallic powder is, for example, calcinated at 800° to 900° C. for 2 hours, in which period the powder can be oxidized in a short time, but the ferrite of the powder can be completely performed. The powder is then pulverized to approximately 0.8 to 1.4 microns in diameter, is then compression molded to a predetermined shape, and is sintered at 1340° C. for 3 hours. An example of the magnetic characteristics of the oxide was 2000 to 2500 of initial magnetic permeability $\mu_0$, 3000 to 4500 of second peak magnetic permeability $\mu_{Sp}$ and approx. 5100 of saturated magnetic flux density Bm. Slight alterations of the magnetic properties of the ferrite can be made by adding 0.1 to 0.5 weight % in the conversion of oxide of at least one selected from $V_2O_5$, $TiO_2$, $Al_2O_3$, $SiO_2$ or CaO.

Examples of the process of the present invention will now be described.

EXAMPLE 1

376 g of $Fe_2O_3$, 3.5 g of ZnO, 0.05 g of CaO and 0.01 g of $SiO_2$ were weighed and added to 30 g. of high carbon ferro-manganese rough particle powder, water was then added to the mixture, thereby producing 50% of slurry. The slurry was pulverized by an air ventilation type vibration mill for 5 hours. The slurry thus pulverized was dehydrated and was formed into a pellet. The pellet was then heated at 850° C. for 2 hours, was then calcinated, and was pulverized in wet state for 2 hours. The powder was then dehydrated, a small amount of binder was added to the powder, and the mixture was then molded in a doughnut shape. The mixture was then heated at 1320° C. for 3 hours, and was cooled in $N_2$ gas containing 0.25% of $O_2$. The characteristics of the specimen were as follows:

| $\mu_0$ | Q | tan d/$\mu_0$ | Bm |
|---|---|---|---|
| 2150 | 45 | $7 \times 10^{-6}$ | 5300 |

EXAMPLE 2

300 g of high carbon ferro-manganese rough particle powder, 651 g of electrolytic iron powder and 0.95 g of CoO were weighed, were filled in an air ventilation type vibration mill together with equal amount of water and 100 g of $H_2O_2$ water, and the mixture was pulverized for 8 hours. Then, 100 g of $H_2O_2$ were supplemented, the mixture was then pulverized for 3 hours, was dehydrated, and was treated in the same manner as the Example 1. The characteristics of the specimen were as follows:

| $\mu_0$ | Q | Bm |
|---|---|---|
| 245 | 60 | 5100 |

EXAMPLE 3

9.2 mol % equivalent to ZnO of electrolytic zinc rough particle powder was weighed, and 37.3 mol % of MnO and 53.2 mol % of $Fe_2O_3$ were weighed and mixed with the electrolytic zinc. CaO and $SiO_2$ were added to become 0.05 wt% of CaO and 0.01 wt% of $SiO_2$ to the mixture. The mixture was then pulverized by a wet ball mill, was dehydrated and granulated, and the powder was calcinated at 850° C., and was pulverized to 1.3 microns in diameter. This powder was then compression molded in a doughnut shape, was then heated at 1350° C. for 2 hours, and was then cooled by adjusting the atmosphere. The characteristics of the specimen was as follows:

20° C. initial magnetic permeability $\mu_0$:2100
80° C. initial magnetic permeability $\mu_{Sp}$:3900
20° C. magnetic flux density Bm=5100

What is claimed is:

1. A process for producing magnetic metallic oxide comprising the steps of:
   pulverizing at least one member selected from the group consisting of ferro-manganese, ferro-nickel, electrolytic manganese, electroytic iron and electrolytic zinc, wherein said ferro-manganese and said ferro-nickel have a carbon content of at least 3% and said electrolytic manganese, said electrolytic iron and said electrolytic zinc are of high plurity,
   adding to said pulverized material at least one member selected from the group consisting of oxides of Fe, Mn, Ni, Cu, Mg, Zn and Co and salts of Fe, Mn, Ni, Cu, Mg, Zn and Co which become oxides by heating,
   ventilating the mixture with a gas containing oxygen and adding an aqueous solution containing at least one of an oxidizer and an acid radical,
   wet pulverizing and mixing the mixture upon oxidation of said pulverized material, thereby producing a slurry, and
   dehydrating, drying, and heating said slurry at 800° to 1450° C. to oxidize and calcine said slurry.

2. A process for producing magnetic metallic oxide comprising the steps of:
   pulverizing at least one member selected from the group consisting of ferro-manganese, ferro-nickel, electrolytic manganese, electrolytic iron and electrolytic zinc, wherein said ferro-manganese and said ferro-nickel have a carbon content of at least 3% and said electrolytic manganese, said electrolytic iron and said electrolytic zinc are of high purity,
   adding water to said pulverized material and ventilating the mixture with a gas containing oxygen to wet pulverize and oxidize said pulverized material,
   adding to the pulverized material at least one member selected from the group consisting of oxides of Fe, Mn, Ni, Cu, Mg, Zn and Co and salts of Fe, Mn, Ni, Cu, Mg, Zn and Co which become oxides by heating;
   wet pulverizing and mixing the mixture, thereby producing a slurry,
   dehydrating, drying and heating said slurry at 800° to 1450° C. to oxidize and calcine said slurry.

3. The process according to claim 1, wherein said slurry contains 36 to 60 mol % of $Fe_2O_3$ and a residue of a non-iron metal oxide.

4. The process according to claim 1, wherein said ferro-manganese and said ferro-nickel are pulverized to 6 to 300 mesh, and are abruptly heated at from 900° to 1000° C. to remove carbon.

5. The process according to claim 1, wherein in the wet pulverizing and mixing step upon oxidation of said pulverized material, water or an aqueous solution which contains at least one of oxygen, hydrogen peroxide, manganese peroxide or its salt, nitric acid, nitrous acid or its salt, sulfuric acid or its salt, $NH_4NO_3$, $FeSO_4$ and $H_2S$ is added and the mixture is pulverized and oxidized.

6. The process according to claim 1, wherein said at least one member selected from the group consisting of oxides of Fe, Mn, Ni, Cu, Mg, Zn and Co and salts and of Fe, Mn, Ni, Cu, Mg, Zn and Co which become oxides by heating, comprise 50 to 98 weight % of the mixture.

7. The process according to claim 1, wherein said slurry is calcined at 700° to 1250° C., is repulverized and heated at a temperature of from 800° to 1450° C.

8. The process according to claim 1, wherein said slurry contains 0.01 to 0.5% of at least one member selected from the group consisting of $V_2O_5$, $TiO_2$, $Al_2O_3$, $SiO_2$ and CaO.

9. The process according to claim 1, wherein said pulverizing and wet pulverizing steps employ a ball mill.

10. The process according to claim 2, wherein in the wet pulverizing step upon oxidation of at least one selected from the group consisting of ferro-manganese, ferro-nickel, electrolytic manganese, electrolytic iron and electrolytic zinc, water or solution containing oxide or acid radical is added, and the mixture is pulverized to less than 10 microns in diameter.

11. The process according to claim 9, wherein the pulverizing media in said ball mill comprise at least one selected from the group coonsisting of ferro-manganese, ferro-nickel, electrolytic iron and electrolytic manganese.

12. The process according to claim 11, wherein said ferro-manganese in said pulverizing media is 40 to 90 wt% of substantially 5 mm in diameter.

13. A process for producing magnetic metallic oxide comprising the steps of:

pulverizing at least one member selected from the group consisting of ferro-manganese, ferro-nickel, electrolytic manganese, electrolytic iron and electrolytic zinc, wherein said ferro-manganese and said ferro-nickel have a carbon content of at least 3% and said electrolytic manganese, said electrolytic iron and said electrolytic zinc are of high purity, adding to said pulverized material a solution containing at least one member selected from the group consisting of an oxidizer and an acid radical to wet pulverize and oxidize said pulverized material, adding to said pulverized material at least one member selected from the group consisting of oxidies of Fe, Mn, Ni, Cu, Mg, Zn and Co and salts of Fe, Mn, Ni, Cu, Mg, Zn and Co which become oxides by heating, wet pulverizing and mixing the mixture, thereby producing a slurry, and dehydrating, drying and heating said slurry at 800° to 1450° C. to oxidize and calcine said slurry.

* * * * *